US009058708B2

(12) United States Patent
Abel et al.

(10) Patent No.: US 9,058,708 B2
(45) Date of Patent: Jun. 16, 2015

(54) BALLOT BOX CART

(76) Inventors: Gary V. Abel, Ellicott City, MD (US);
Joseph Wilson, Spencer, WV (US)

( * ) Notice: Subject to any disclaimer, the term of this patent is extended or adjusted under 35 U.S.C. 154(b) by 439 days.

(21) Appl. No.: 13/350,186

(22) Filed: Jan. 13, 2012

(65) Prior Publication Data

US 2012/0111941 A1      May 10, 2012

Related U.S. Application Data

(60) Continuation-in-part of application No. 13/323,117, filed on Dec. 12, 2011, now Pat. No. 8,474,834, which is a division of application No. 12/380,738, filed on Mar. 3, 2009, now Pat. No. 8,075,004, which is a continuation-in-part of application No. 11/899,333, filed on Sep. 5, 2007, now Pat. No. 7,654,457.

(60) Provisional application No. 61/438,390, filed on Feb. 1, 2011.

(51) Int. Cl.
*B62B 3/02*  (2006.01)
*G07C 13/02*  (2006.01)
*B62B 3/10*  (2006.01)

(52) U.S. Cl.
CPC . *G07C 13/02* (2013.01); *B62B 3/02* (2013.01); *B62B 3/10* (2013.01)

(58) Field of Classification Search
CPC ........... A47F 5/10; B62B 3/002; B62B 3/003; G07C 13/02

USPC ............. 280/47.34, 47.35, 47.39, 79.11, 79.2
See application file for complete search history.

(56) References Cited

U.S. PATENT DOCUMENTS

| 2,054,102 | A | * | 9/1936 | Shoup et al. ............... 235/55 R |
| 3,682,375 | A | * | 8/1972 | Partovi-Najafabadi ..... 235/50 A |
| 3,877,744 | A | * | 4/1975 | Miller ............................. 296/22 |
| 3,904,853 | A | * | 9/1975 | Shoup et al. .................... 235/51 |
| 2003/0047596 | A1 | * | 3/2003 | Brown ............................. 235/51 |

* cited by examiner

*Primary Examiner* — Hau Phan
*Assistant Examiner* — Bryan Evans
(74) *Attorney, Agent, or Firm* — Ober, Kaler, Grimes & Shriver; Royal W. Craig

(57) ABSTRACT

A utility cart for storage, transport and setup of voting devices into a completely-operational configuration, ready for use, while still on the cart. The utility cart employs a deployable privacy curtain that erects a 360 degree private voting environment around the equipment using the voting equipment. When loaded with a tabulator/ballot box, the cart may be wheeled from storage into a usable position in the precinct, onboard equipment plugged in, the utility cart deployed and privacy curtain erected, and the precinct is then ready for voting traffic. All the loaded equipment is fully protected during transport and restrained against lateral motion, and yet when deployed full access is given to the control panels, doors, etc. Moreover, the particular design maximizes strength and usability, and yet keeps weight to a minimum with a framework that is as light weight as possible.

20 Claims, 5 Drawing Sheets

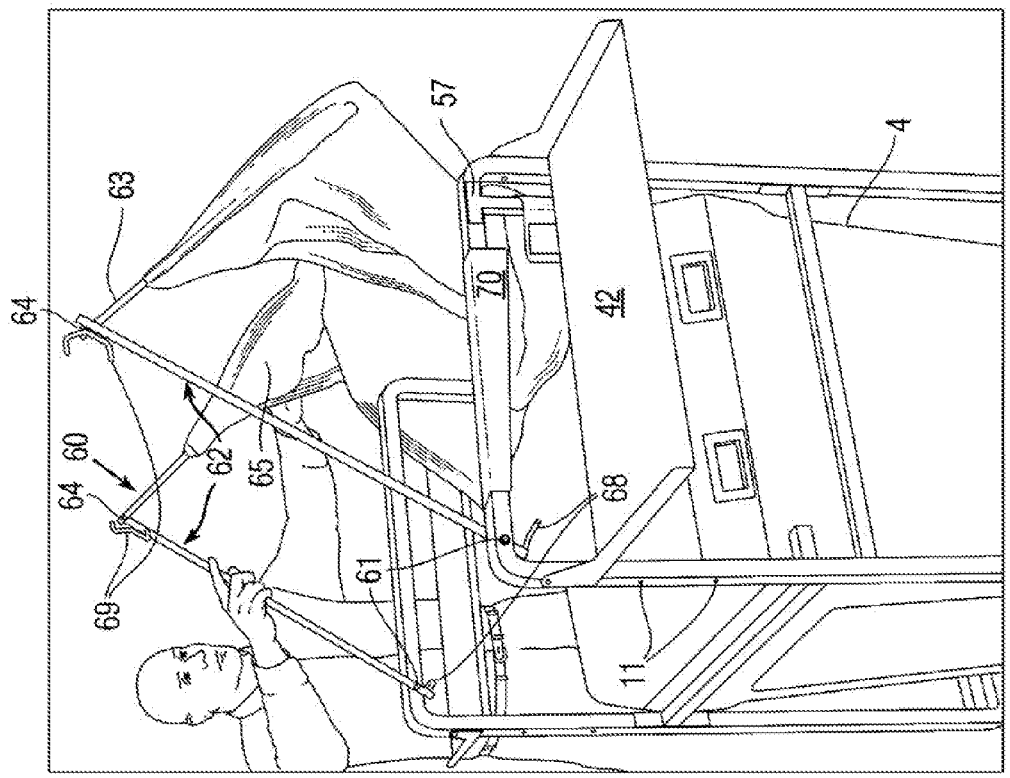
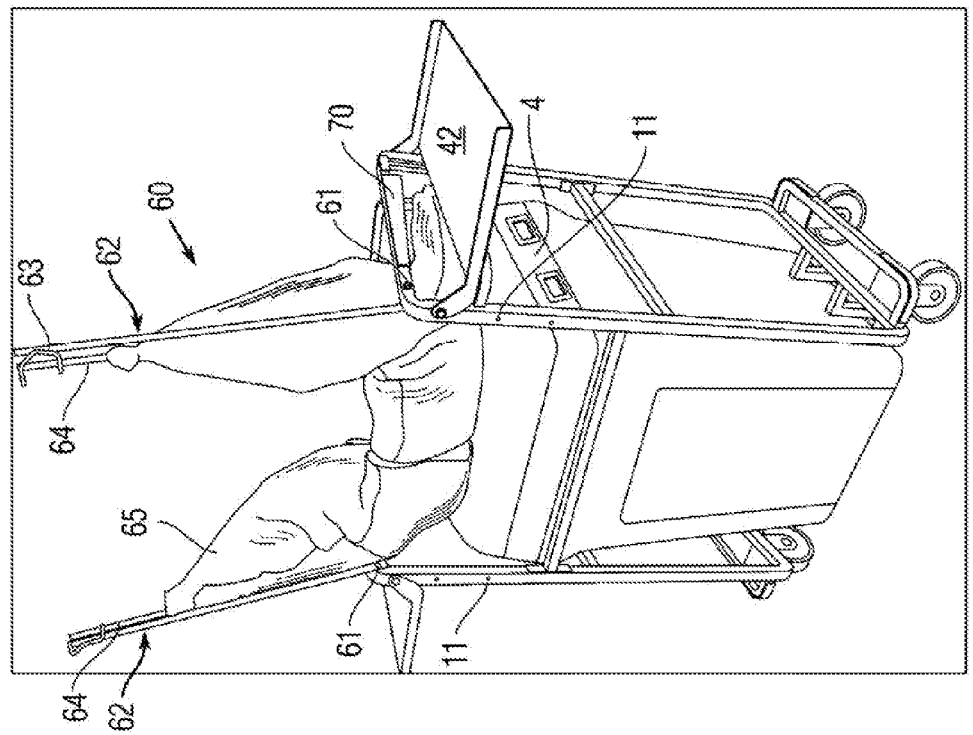
Fig. 5
Fig. 4

BALLOT BOX CART

CROSS-REFERENCE TO RELATED APPLICATION

The present application derives priority from U.S. provisional application No. 61/438,390 filed 1 Feb. 2011 now U.S. Pat. No. 8,474,834, and is a continuation-in-part of U.S. patent application Ser. No. 13/323,117 filed 12 Dec. 2011, which is a divisional of application Ser. No. 12/380,738 filed 3 Mar. 2009 now U.S. Pat. No. 8,075,004, which is a continuation in part of application Ser. No. 11/899,333 filed 5 Sep. 2007 now U.S. Pat. No. 7,654,457.

BACKGROUND OF THE INVENTION

1. Field of the Invention

The present invention relates to accessories for voting devices and, more particularly, to a specially-adapted utility cart for storage and/or transport of a voting terminal, optical scan ballot counter and ballot box in a useable configuration, for parking said optical scan ballot counter and voting terminal in an accessible position for use by a voting judge or voter, the utility cart incorporating a deployable privacy curtain for maintaining voter confidentiality.

2. Description of the Background

Voting is one of the most fundamental acts of a democratic society, and the privacy of the voters is paramount for several reasons. First of all, privacy avoids post-election partiality by the winning government. Secondly, privacy ensures that voters are not influenced by the popular vote. For these reasons there are laws to ensure voter privacy, and voting booths to comply with these laws.

A voting booth provides an individual voter with an enclosed area for casting a vote, using a ballot, mechanical, or electronic voting system, at a polling-place facility. This ensures voter anonymity. Voting booths can be permanent against-the-wall enclosures each having a door or curtain. However, given the infrequent nature of elections polling places are seldom single purpose facilities. Most polling-places are temporary facilities—often times schools, halls, and local government offices—that are used for voting on a temporary basis because elections only occur periodically over a short time period. Permanent voting booth installations are not possible in this case, and instead it is necessary to store and transport multiple voting booths between a storage location (during non-election periods) and the polling-place (during elections). Consequently, voting booths are typically free-standing temporary structures having a shelf and privacy panels that obstruct the view of others in the vicinity.

Some jurisdictions are entirely paper-based, and voters punch cards and deposit them in a ballot box. However, electronic voting systems are increasingly replacing traditional paper-based voting systems due to convenience and ease and accuracy of counting votes. There are paperless electronic voting systems such as public network kiosks that use electronic ballots to transmit vote data from the polling place to another location over a public network.

Whether traditional paper-based or paperless, the terminal equipment is relatively portable. Consequently, the voting booths used are typically free-standing platforms with a shelf and privacy panels such as shown in the present inventor's U.S. application Ser. No. 12/719,996 filed 9 Mar. 2010.

However, traditional paper-based systems are not in widespread use due to the inconvenience and propensity for error in tabulating votes, and security issues or paperless systems are not in widespread use due to security issues and the difficulty in auditing results. Consequently, most electronic systems in use today still compile a paper ballot. For example, the most prevalent voting terminals are direct-recording electronic (DRE) voting machines which record votes by means of an electronic ballot display (typically a touchscreen) that records voting data and ballot images onto a removable memory component, and as a printed copy.

There are many manufacturers of DREs including Diebold Election Systems, ES&S, Sequoia Voting Systems, Hart Intercivic, etc. For example, the AutoMARK™ voter assist terminal by AutoMARK Technical Services (ATS) is a ballot-marking terminal sized at approximately 2'×2'×1.5°) and features a fold-out 15" full-color touch-screen display. Voters securely cast their vote for each race and/or ballot proposition simply through the touch of the screen or by way of audio guidance. When the voter inserts the ballot into the AutoMARK, an electronic version of the ballot appears on the screen and can be read electronically to the voter. Upon the voter's direction, the AutoMARK marks the ovals on the optical scan ballot.

Whether using a DRE or any other optical scan voting terminal the voter completes a paper ballot and the voter (or official) inserts this ballot into an optical scan ballot counter for tabulation, after which the paper ballot is deposited into a sealed ballot box. Again, there are many manufacturers of ballot counters. For example, the ES&S Model D200 is an easy-to-use, high-speed central paper ballot counter and vote tabulator that processes at a speed of over 300 ballots per minute. The ES&S Model DS200 Ballot Counter is approximately the size of a large computer server (approximately 2.5'×2'×4.5') and nests within a ballot box approximately the size of a standard household garbage can. The ballot box has a hinged lid that opens to expose/deploy the ballot counter seated therein. In use, the ES&S DS200 functions much like a traditional paper ballot system. Upon entering the voting precinct, the voter will receive a paper ballot; the voter then shades in the paper ballot with any standard pen or pencil and inserts the ballot into the ES&S DS200, where they are given a chance to review their votes. The DS200 optically scans the ballot and drops the ballot into the ballot box. As votes are entered, the ES&S DS200 stores the vote tallies on its internal memory card. When the polls close, the ES&S DS200 prints out the precinct's vote report on paper.

Many voting precincts use DRE equipment such as the ES&S DS200, and they typically employ six to twelve voting stations each having a optical scan voting tabulator and ballot box. It is not an easy task for precinct workers to deliver, move in, set up, monitor, remove and return to storage this voting equipment. Most precincts now either manually carry and transport the equipment on multiple trips or use standard utility carts similar to those which carry folding chairs. These generic utility carts normally comprise a simple platform mounted on wheels or casters to provide mobility, and upwardly protruding side-members to constrain the equipment. Such carts take no security precautions to prevent theft or tampering of the items stored within the cart, and do not facilitate on-board access to the equipment. Additionally the use of generic carts with standard platforms does not position the voting equipment at the optimum height. Nevertheless, the equipment for each voting booth (optical scan ballot tabulator, and ballot box) is loaded onto the utility cart which is then wheeled into position (proximate the voting terminals) for use. Since the equipment is not accessible while on the cart, it must be off-loaded and the cart removed for voting. After voting the process is reversed.

It would be much more convenient to devise a utility cart that houses the optical scan ballot tabulator and ballot box combination fully protected while in transport or storage, and yet deployable for setup and use while still seated in the utility cart. What is needed is a ballot box cart with strong compartmentalized mechanical restraints to protect against shifting of the equipment, robust security features to protect against theft and/or tampering with the equipment, and yet fully articulated to provide frontal and side access to the voting equipment to allow access to and control of their consoles. In addition, it would be advantageous to provide a ballot box cart with deployable privacy mechanism to erect an enclosed area for balloting, that retracts and stows for easy transport and storage.

SUMMARY OF THE INVENTION

According to the embodiments of the present invention, it is, therefore, an object of the present invention to provide a storage and transport cart specifically adapted for wheel transfer of voting equipment such as an optical scan voting terminal and ballot box to a voting precinct, and deployment thereof in a fully operational configuration while still seated on the utility cart.

It is another object to provide a utility cart as above that facilitates the voting process in which a voter completes a paper ballot and the voter (or official) inserts this ballot into an optical scan ballot counter for tabulation, after which the paper ballot is deposited into a sealed ballot box.

It is another object to provide a voting cart with robust mechanical restraints to protect against shifting of the equipment, robust security features to protect against theft and/or tampering with the equipment, and yet full frontal and side access to the voting equipment to allow access to and control of the consoles.

It is another object to provide a storage and transport cart as above with a deployable privacy curtain to provide an enclosed area about said voting terminal for casting a vote.

It is another object to provide a storage and transport cart as above with deployable privacy curtain that affords complete 360 degree privacy to a voter or official when using the voting equipment, and yet which folds into a completely unobtrusive position for storage and transport.

According to the present invention, the above-described and other objects are accomplished by providing a specially-adapted utility cart for storage, transport and setup of voting devices into a completely-operational configuration, ready for use, while still on the cart. The utility cart employs a deployable privacy curtain that erects a 360 degree private voting environment about a voter when using the voting equipment. An embodiment of the utility cart is shown for supporting an optical scan voting tabulator and ballot box combination. A plurality of such utility carts loaded with tabulator/ballot boxes may be wheeled from storage into a usable position in the precinct, onboard equipment plugged in, the utility cart deployed and privacy curtain erected, and the precinct is then ready for voting traffic. All the loaded equipment is fully restrained against lateral motion, and yet all equipment is given full access to their control panels, doors, etc. Moreover, the particular design maximizes strength and usability, and yet keeps weight to a minimum with a framework that is as light weight as possible.

BRIEF DESCRIPTION OF THE DRAWINGS

Other objects, features, and advantages of the present invention will become more apparent from the following detailed description of the preferred embodiment and certain modifications thereof, in which:

FIGS. 4-7 are sequential perspective views illustrating the deployable privacy mechanism 60 and its usage.

DETAILED DESCRIPTION

The present invention is a utility cart designed for storage and/or transport of voting equipment, and particularly of an optical scan tabulator/ballot box combination, in a convenient, secure and compact configuration from storage to a voting precinct. The utility cart is fully deployable to facilitate deployment of the voting equipment to a "ready-for-use" configuration while still securely mounted on the utility cart, and this includes a deployable privacy curtain to establish an enclosed area about the voting equipment and cart.

The utility cart will be described by way of an exemplary embodiment adapted for bearing an optical scan tabulator/ballot box combination, and particularly an ES&S DS200 μm precinct-based, voter-activated paper ballot counter and vote tabulator nested atop steel reinforced plastic ballot box.

Figure 1:
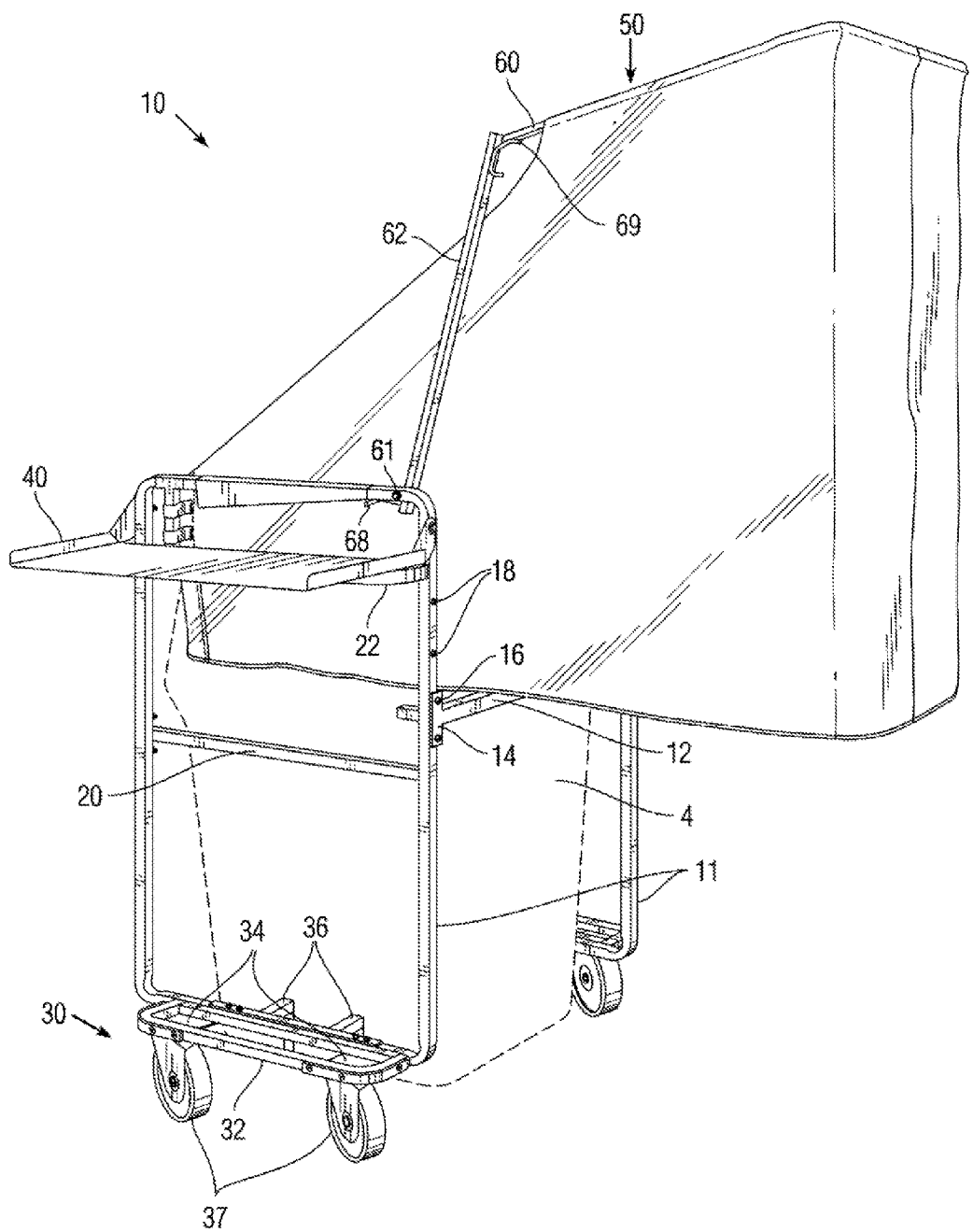
FIG. 1 is a perspective illustration of the utility cart 10 according to a first embodiment in a deployed configuration and carrying an open ballot box 4 (with optical scan voting tabulator exposed).

FIG. 1 illustrates the utility cart 10 according to the first embodiment carrying the steel reinforced plastic ballot box with cover closed, and ES&S DS2000™ ballot counter/vote tabulator stowed inside. However, one skilled in the art should understand that the utility cart 10 may be easily adapted for carrying and deploying other types or brands of voting equipment, such as DREs including Diebold Election Systems, ES&S, Sequoia Voting Systems, Hart Intercivic, etc., punch card systems such as the Datavote™ or Votomatic™, which required the voter to punch out a perforated rectangle (i.e., a chad) from a card using a stylus, or fully electronic voting terminals. Therefore, the illustrate embodiment is not intended to be self limiting.

The ballot cart 10 generally comprises an opposing pair of side-members 11 bound together by a plurality of semi-removable and permanent cross-beams, and combined to define a fixed three dimensional rack storage space for the ballot box/tabulator 4. Both side-members 11 as well as all cross-beams may comprise continuous rod-like members formed of, for example, round or square ¾-1" steel tube stock. Side-members 11 are identical, formed in the shape of a rectangle or "U", and when parallely-spaced define a frame with a protected interior volume. The side members 11 are joined together medially by a pair of transverse semi-removable cross-struts 12 which are preferably adjustable in height. This is accomplished as illustrated by forming the cross-struts 12 with distal perpendicular yokes 14 attached at the ends of the cross-struts 12. The cross-struts 12 are attached transversely between the opposing side members 11 and are attached by nut/bolt combinations inserted into a series of vertically-spaced holes 18 in the upper sections of the cross-struts 12, thereby locking the cross-struts 12 in position at a user-selectable height. The cross-struts 12 are made semi-removable by employing one-way tamperproof bolts 16. This way, the ballot box/tabulator 4 can be easily positioned inside the ballot cart 10, but once seated therein cannot be removed from the ballot cart 10 without special tooling.

Each side-member 11 is itself reinforced by a medial cross-strut 20 running side-to-side, and cross-struts 20 may likewise use perpendicular yokes attached at the distal ends and one-way tamperproof bolts 16 which traverse the yokes and engage holes in the side-members 11 to lock the cross-struts 20 in position at a user-selectable height.

Each side-member 11 is further reinforced by a fixed medial handle 22 running side-to-side above the cross-struts 20, handles 22 preferably being welded to the side-members 11. Both handles 22 are likewise continuous rod-like members formed of the same rod-like stock in the shape of a shallow inverted "U." The distal ends of handles 22 are fixedly attached to a respective section of a side-member 11 as shown so that the U protrudes sideward, thereby extending convenient grab handles on opposing sides of the cart 10.

Figure 2:
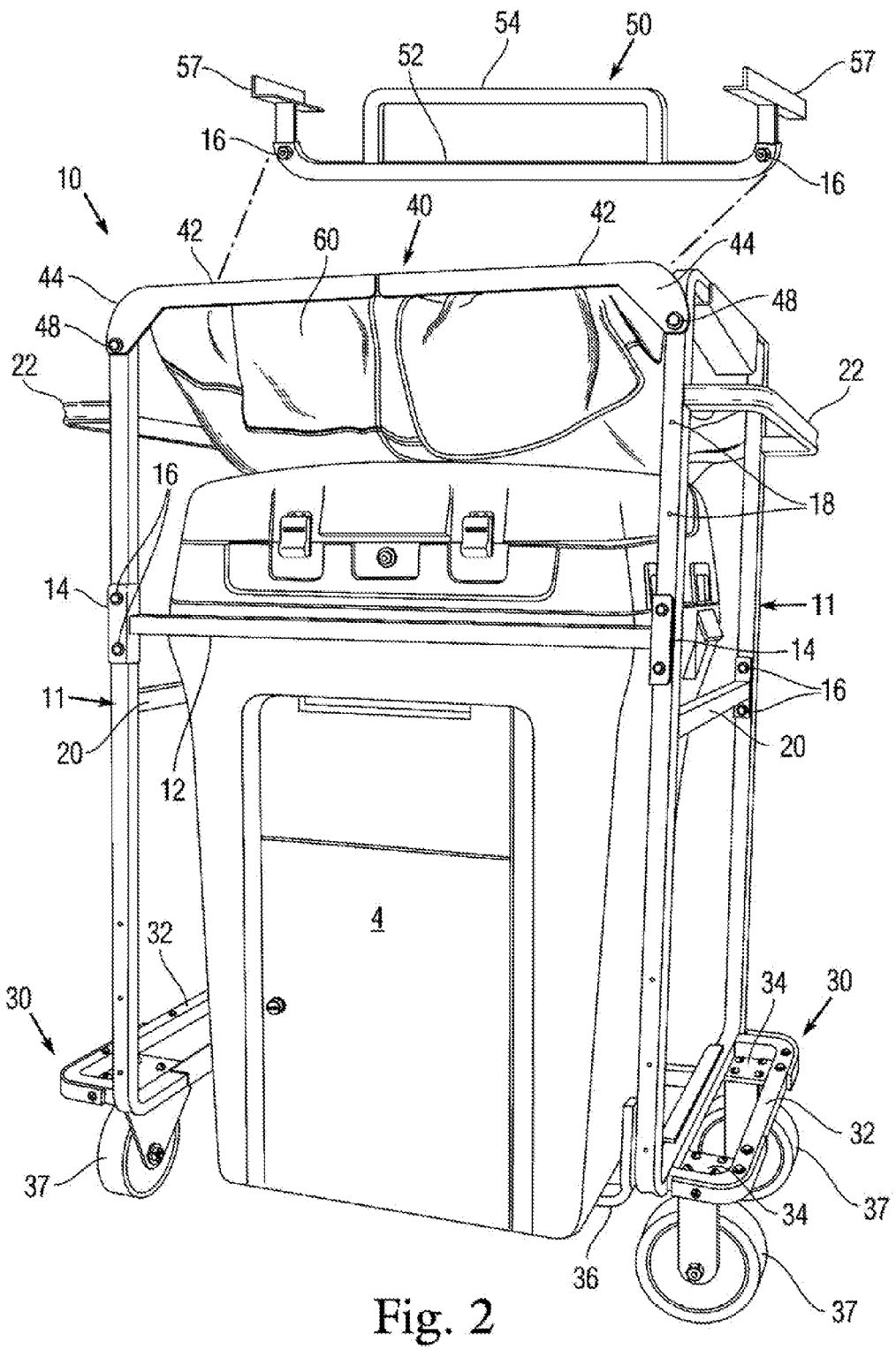
FIG. 2 is a perspective illustration of the utility cart 10 in a non-deployed configuration and carrying a closed ballot box 4 (with optical scan voting tabulator inside).

As seen in FIG. 2 a transverse semi-removable grab handle 50 (shown detached) spans the opposing side members 11 at the rear. The semi-removable grab handle 50 is formed of a cross-strut 52 similar to cross-struts 12, and an integral handle section 54 formed of the same rod-like stock in the shape of a shallow inverted "U." The distal ends of cross-strut 52 turn upward at an elbow and expose open receptacles. A pair of T-brackets 57 are adjustably inserted in each receptacle in the distal ends of cross-strut 52, and are secured therein by tamperproof bolts 16. Each of T-bracket 57 is an upwardly directed stem joining a horizontal length of angle bracket. The angle brackets atop T-brackets 57 are fixedly attached by tamperproof screws underneath the upper rear corners of the side members 11 (visible in FIG. 5). The integral handle section 54 is fixedly attached to cross-strut 52 as shown so that the U protrudes upward, thereby extending grab handle 50 at the rear of the cart 10. The cross-strut 52 is likewise formed with distal perpendicular yokes attached at the ends of the cross-strut 52. The cross-strut 52 is attached transversely between the opposing side members 11 at approximately the same height as of handles 22, and secured thereto by tamperproof bolts 16 inserted into holes in the upper sections of the side members 11, thereby locking the cross-strut 52 in position. Again, the semi-removable nature of grab handle 50 facilitates positioning of the ballot box/tabulator 4 inside the ballot cart 10, but once attached it cannot be removed through the rear of the ballot cart 10 without special tooling.

Opposing wheel assemblies 30 are mounted at the bottom of each side-member 11, each wheel assembly comprising a U-shaped strut 32 similar to handles 22 and each fixedly attached corner-to-corner along side-members 11 so that the U protrudes sideward, thereby extending the wheel assemblies 30 outward on opposing sides of the cart 10 for improved stability. Each a U-shaped strut 32 is equipped with a pair of heavy duty casters 37 protruding downwardly therefrom. The four casters 37 are preferably each 6" swivel casters, with optional brake-lock capability, though other types of casters may suffice. The commercial casters 37 used herein include flat reinforcement plates 34 which can be welded to the bottom across the side-members 11 and struts 32 in the respective corners for load-bearing reinforcement.

The above-described components define a framed internal rack storage area for protecting the ballot box 4, and another pair of U-shaped struts 36 is attached between the two side-members 11 at the bottom and protrude downward to cradle and support the ballot box 4 within the framed internal rack storage area. The U-shaped struts 36 are preferably defined by a series of vertical holes for tamper-proof bolt-securement to the two side-members 11 at a user-selectable height so that the vertical position of the ballot box/tabulator 4 within the ballot cart 10 can be adjusted. This is important to ensure that the ballot box opening is located at the desirable optimum height. The particular combination of fixed components 11, 20, 22 maintain the integrity of the frame, with semi-removable components 12, 36, 50 at the front, sides and bottom of the ballot cart 10 permit insertion of the ballot box/tabulator 4 but prevent removal, thereby deterring theft and vote tampering.

Attached to the top of the two side-members 11 is a dual-function bifold protective cover/working surface assembly 40, and a deployable privacy mechanism 60. Both cover/working surface assembly 40 and deployable privacy mechanism 60 (as well as the ballot box 4) are shown in a non-deployed compact configuration in FIG. 2 suitable for transport or storage, but are illustrated in FIG. 1 in a deployed configuration ready for use by voters or election officials.

Figure 3:
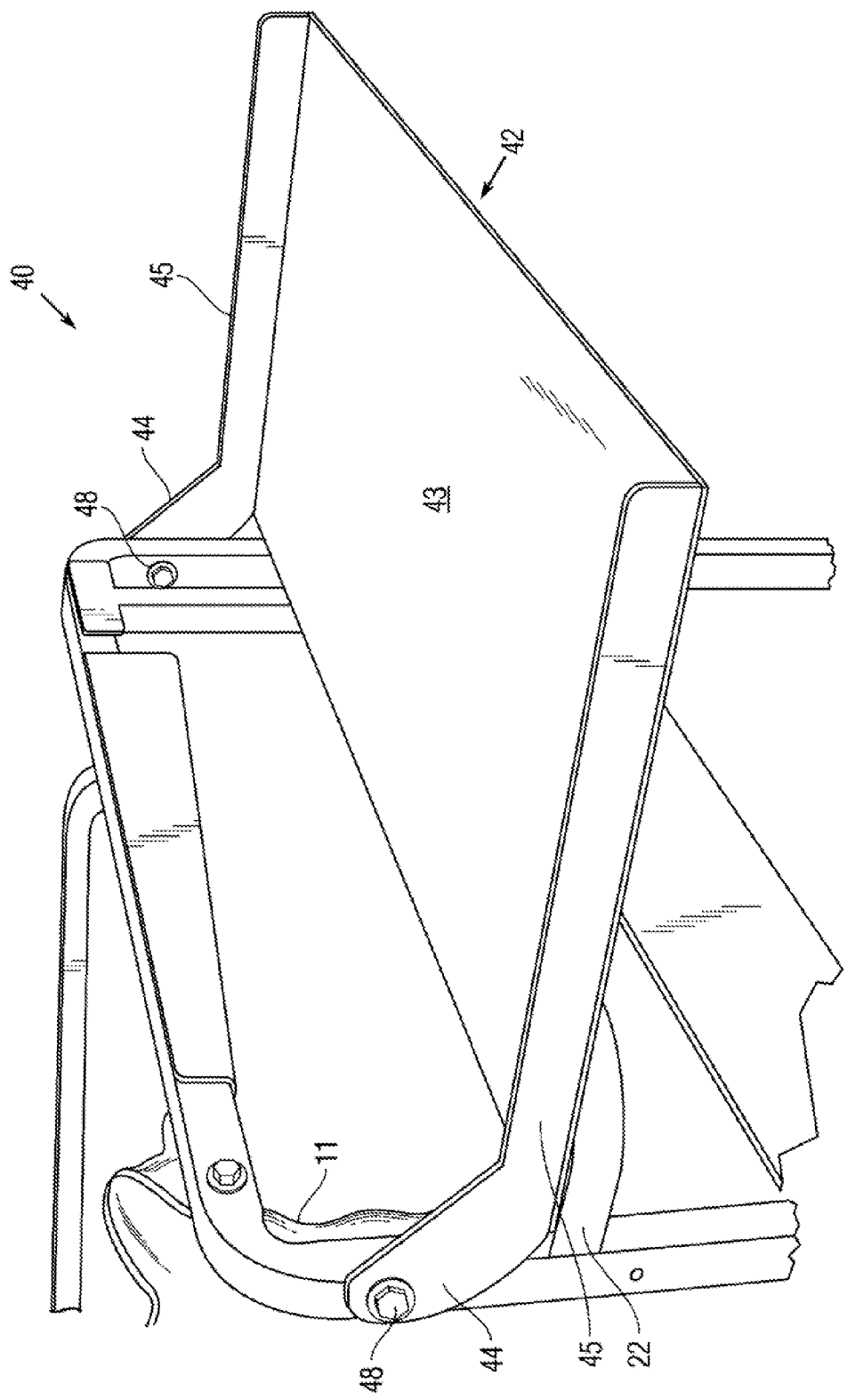
FIG. 3 is a top perspective view of the working surface assembly 40 deployed.

As best seen in FIG. 3, the protective cover/working surface assembly 40 further comprises a pair of opposing panels 42 (left one shown) each pivotally attached to a respective side-member 11 by offset hinges 44. In a closed position as shown in FIG. 2, the opposing panels 42 combine to completely cover the ballot box 4, ensuring topside protection. In an open position as shown in FIG. 1 or 3 the opposing panels 42 are pivoted to the sides of side members 11 and protrude transversely therefrom to provide a working surface on either side of the voter cart 10, s that voters or election officials can rest ballots, purses, etc. Each of the pair of opposing panels 42 further comprises a flat rigid rectangular section 43 reinforced along its peripheral edges by upwardly bent flanges 45. The offset hinges 44 are also flanges affixed by welding or the like to the outside ends of the upwardly bent flanges 45, and extending outward and angled upward (in FIG. 3) for pivotal coupling to the sides of side members 11 at pivot points 48 located 2-3" down alongside members 11. The opposing panels 42 are identical, and the length of their underlying reinforcing struts is calculated with regard to the distance between opposing side members 11 so that the outermost edges of the opposing panels 42 directly face each other when pivoted inward. In this facing (closed) horizontal position the panels 42 come to rest atop the handle bar 54 of handle 50 which prevents further pivoting past horizontal, and the panels 42 form a unitary protective cover over the voting equipment in the closed horizontal position. Conversely, the positions of the side handles 22 are calculated so that they serve as abutments when the opposing panels 42 are pivoted open as seen in FIGS. 1 and 3, preventing further pivoting past a substantially horizontal position so that panels 42 serve as weight-bearing shelves to provide a working surface on either side of the voter cart 10 for voters or election officials. The ability of these opposing panels 42 to fully open when deployed, completely non-obstructive of the space overhead the ballot box 4 is an essential feature of the invention, as can be seen from the normal use and operation of the voter cart 10, including the deployable privacy mechanism 60, as will be described. This configuration allows clear access to the front and rear electronic panels, internal memory chips, and data ports of the tabulator inside the ballot box 4 without removing the voting equipment from cart 10. This makes voting as well as access for retrieval of the memory chips and other electrical connections much easier.

FIGS. 4-7 are sequential perspective views illustrating the deployable privacy mechanism 60 and its usage. The deployable privacy mechanism 60 generally comprises an opposing pair of pivoting arms 62 attached at one end to pivot points 61 located at the upper front corners of side members 11, and a unitary U-shaped curtain support member 63 pivotally attached by its distal ends at pivot points 64 to the other ends of pivoting arms 62. A fabric or synthetic privacy curtain 65 suspended at the top from the U-shaped curtain support member 63, and is removably attached to the rear of the cart 10 such as at side members 11 or grab handle 50. Both of pivoting arms 62 are of length substantially equal to the front-to-back extent of ballot cart 10, as is the U-shaped curtain support member 63. This way, when stowed, the pivoting arms 62 align with and fold flat against the upper extent of side members 11, as do the legs of U-shaped curtain support member 63. Consequently, these components 62, 63 fold accordion-style into the open top of the ballot cart 10. In the preferred embodiment, a pair of angle brackets 70 are attached by welding or the like along the upper extent of side members 11, and suspend inwardly directed flanges below the side members 11 for cradling the arms 62 and curtain support member 62 when in their stowed position. The angle brackets 70 may be welded or otherwise attached to the side members 11 and extend downward to a horizontal flange, the flange protruding inward an inch or two to catch and seat the arms 62 and curtain support member 62. As illustrated, the flanges of angle brackets 70 preferably run front-to-back and a downward incline (more recessed toward the rear of the ballot cart 10) to ensure that both arms 62 and curtain support member 62 rest submerged beneath the upper extent of side members 11. This way, with arms 62 and curtain support member 62 cradled in flanges 70 in their stowed position (FIG. 2), the opposing panels 42 can be pivoted inward and engaged together, thereby forming a unitary protective cover over the stowed privacy mechanism 60.

Figure 7:
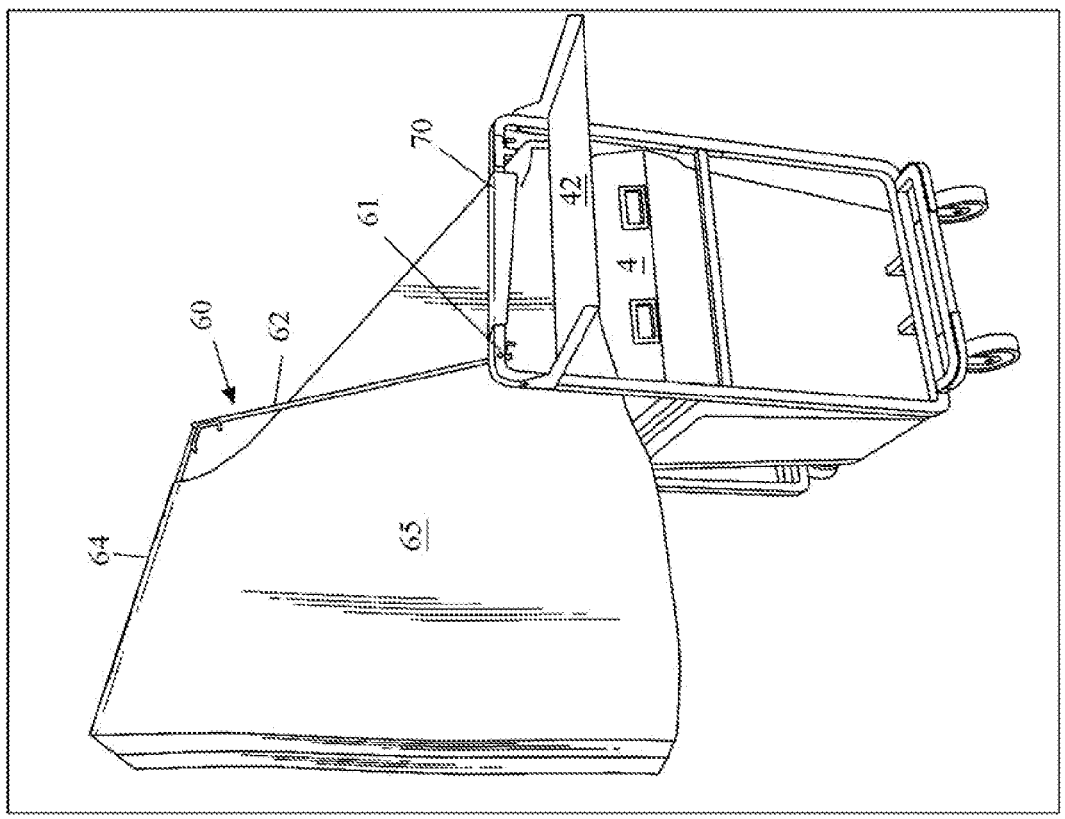

As best seen in FIG. 5, both pivoting arms 62 extend approximately one inch past their pivot points 61 and are equipped with a stop-hook 68 at their distal ends to limit outward pivoting. Similarly, the opposing ends of both arms 62 are equipped with a double stop-hook 69 proximate pivot joints 64 to limit pivoting of U-shaped curtain support 63 within a defined range to assure rotation in the proper direction. Specifically, with respect to FIG. 1, one protruding prong of hooks 69 limits counterclockwise rotation of U-shaped curtain support 63 so that it nests parallel with arms 62. The other protruding prong of hooks 69 limits clockwise rotation of U-shaped curtain support 63 so that it stays extended (as depicted). In combination, arms 62 are rotated clockwise until stop-hooks 68 hook underneath the corners of the side members 11 and stop pivoting of arms 62 about pivot points 61 when deployed forwardly approximately 10 degrees past vertical. U-shaped curtain support 63 is then rotated forwardly until it abuts stop-hooks 69 on arms 62, thereby suspending the U-shaped curtain support member 63 forwardly and overhead past the pivoting arms 62, approximately 80 degrees past (exactly as shown in FIGS. 1 and 7). This suspends privacy curtain 65 downward in front of the cart 10 as shown. Stop-hooks 68, 69 may be simple bent-wire-lengths welded to the pivoting arms 62, and bent into the path of travel.

The privacy curtain 65 may be furled around U-shaped curtain support member 63 and easily stowed along with the entire privacy mechanism 60. Conversely, when deployed, the tension of the fabric privacy curtain 65 itself adds structure to the enclosure. The privacy curtain 65 is a four-sided sewn structure with two suspending polygonal side-panels, a slotted front panel for easy standup entry, and a top panel. The privacy curtain is wedge-shaped, the top panel being angled downward toward the rear of the ballot cart 10, and the sides being substantially horizontal. The rear edge of privacy curtain 65 may be secured to the rear of the ballot cart 10 by hook and loop straps, snaps, or any other acceptable means. The privacy curtain 65 is secured along the length of the U-shaped curtain support member 63, and may be sewn with a peripheral sleeve so that the U-shaped curtain support member 63 can be inserted there through as shown. When the privacy mechanism 60 is forwardly deployed as shown in FIGS. 1 and 7, the securement to the rear of the ballot cart 10 anchors it and also helps to limit forward pivoting. The tension also helps the privacy curtain 65 drape uniformly, which improves aesthetics. The privacy curtain 65 hangs evenly down at the front for convenient entry through the slotted front panel, and by virtue of the backward tension combined with the spreading action of support member 63 and pivoting arms 62 dewrinkles the privacy curtain 65 and gives it a clean three-dimensional wedge-shaped appearance.

Referring collectively to FIGS. 4-7, when in use the ballot box/tabulator 4 is seated on U-shaped struts 36 inside the rack storage area while semi-removable components 12, 20, 36, 50 at the front, sides and bottom of the ballot cart 10 are removed, and once seated those components are reinstalled with tamper proof bolts 16. Additional voting equipment and accessories can be stored, if desired, by increasing dimensions and/or adding shelves herein. The privacy curtain 65 is inserted onto the U-shaped curtain support member 63, is strapped to the rear of the cart 10, furled about the U-shaped curtain support member 63, and the U-shaped arms 62 and curtain support member 62 are folded and cradled in angle brackets 70 to stow the privacy mechanism 60. Likewise, the opposing panels 42 are pivoted inward to form a unitary protective cover over the stowed privacy mechanism 60. The ballot box 10 is ready for wheeled transport and storage. At the next election, the ballot cart 10 is retrieved, wheeled back into the precinct, and parked in an accessible position for use by voting judges and/or voters.

As seen in FIG. 4, the opposing panels 42 are pivoted outward to their sidelong support shelf position, and the privacy mechanism 60 is deployed.

Figure 6:
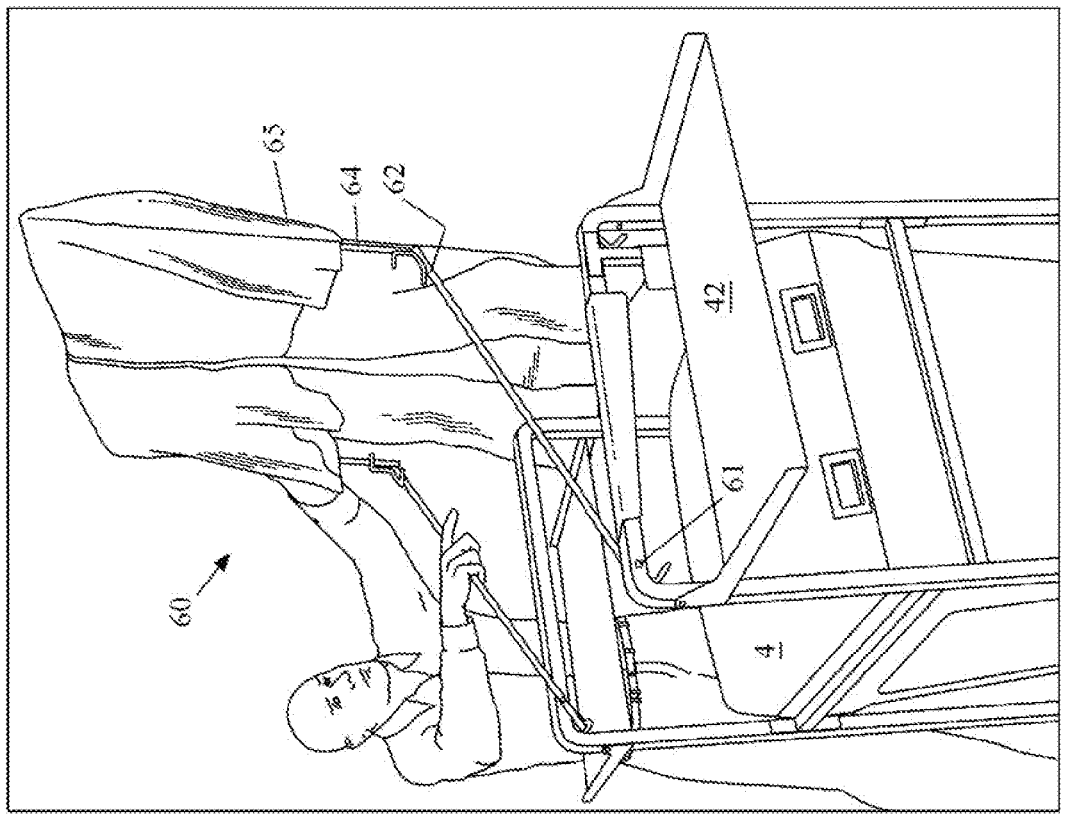

As seen in FIGS. 5-6, the arms 62 are pivoted upward from flanges 70 until the stop-hooks 68 engage, and U-shaped curtain support member 63 is pivoted outward until stop hooks 69 engage. The privacy curtain 65 is unfurled, and as seen in FIG. 7 it is draped downward to suspend a private enclosure about the voter and voting equipment, thereby ensuring complete voter confidentiality. At this point the ballot box/tabulator 4 remains seated in the cart 10 in a closed configuration, but the headspace above it is completely open. Thus, the cover of the ballot box may be opened to reveal the ballot counter/vote tabulator stowed inside. The election official need only plug the equipment in and to ready it for voting traffic. Because the ballot counter/vote tabulator is deployed at waist-level, it is easily accessible to standing or wheelchair voters. The equipment is fully accessible while on the cart 10, and it need not be off-loaded for voting. Moreover, the ballot box/tabulator 4 remains fully restrained against side-to-side motion during voting or transport, and yet the open-frame design allows full access to the control panels and consoles. Moreover, the particular design maximizes strength and usability, and yet keeps weight to a minimum with a framework that is as light weight as possible. After voting, the process is reversed and the cart 10 is removed without precinct workers lifting any equipment.

One skilled in the art should understand that the utility cart 10 may be easily adapted for carrying and deploying other types or brands of voting equipment, such as DREs including Diebold Election Systems, ES&S, Sequoia Voting Systems, Hart Intercivic, etc., punch card systems such as the Datavote™ or Votomatic™, which required the voter to punch out a perforated rectangle (i.e., a chad) from a card using a stylus, or fully electronic voting terminals, all without departing from the scope or spirit of the invention.

Although the privacy mechanism 60 and protective cover/working surface assembly 40 have special utility when used together and further in combination with the particular utility cart structure as disclosed above, it should be readily apparent that both these features may be used independently, and easily affixed alone or together to various other utility cart frames as needed for a particular precincts voting equipment. Therefore, the illustrated embodiment is not intended to be self limiting. One skilled in the art should understand that other accessories are possible in addition to those shown, which are illustrative only. In all such cases the ballot cart 10 according to the present invention provides a storage and transport solution especially suited for a variety of voting devices including manual or touch-screen voting terminals, optical scan voting tabulators, paper-based equipment, Ballot on Demand Printers as well as other equipment as desired, with robust security and privacy features. Therefore it should be appreciated that numerous modifications and other embodiments may be devised by those skilled in the art. Additionally, feature(s) and/or element(s) from any embodiment may be used singularly or in combination with other embodiment(s) and steps or elements from methods in accordance with the present invention can be executed or performed in any suitable order. The appended claims are intended to cover all such modifications and embodiments, which would come within the spirit and scope of the present invention.

What is claimed is:

1. A ballot cart for transporting voting equipment inclusive of a voting terminal, and for parking said voting equipment in an accessible position for use by election officials and voters, all while the voting equipment remains seated in the ballot cart, comprising:
   a pair of opposing side-members each defined by at least two tubular vertical struts connected together by a tubular lateral strut;
   a pair of wheel assemblies each comprising a wheel-mount fixture attached to a lower end of said side-members, and a pair of casters attached to and protruding downwardly from each of said wheel-mount fixtures;
   a plurality of tubular transverse struts joining said side members together; and
   a privacy assembly comprising an opposing pair of elongate support arms each pivotally attached at one end by a pivot joint to a respective one of said lateral struts of said opposing side-members, a U-shaped support member pivotally attached at each end by a pivot joint to a respective one of said pair of support arms, and a privacy curtain attached to said U-shaped support member, said pair of support arms and said U-shaped support member being pivotable relative to said opposing side-members and including stop members at said pivot joints to index pivoting of said pair of support arms to a fixed obtuse angle relative to said lateral struts and to index pivoting of said U-shaped support member to a fixed obtuse angle relative to said pair of support arms to thereby suspend said privacy curtain in front of said voting equipment substantially surrounding a voter inside a partially enclosed area in front of the voting terminal.

2. The ballot cart according to claim 1, further comprising a combination cover/shelf assembly comprising a pair of panels each pivotally attached to an upper end of a respective side-members by an offset hinge and adapted to selectively pivot closed overtop said ballot cart for protection of voting equipment stored therein, or open to form opposed weight-bearing shelves protruding laterally outward from said side members.

3. The ballot cart according to claim 1, wherein said plurality of transverse struts further comprise a plurality of fixedly attached transverse struts joining said side-members together, and a plurality of removable transverse struts joining said side-members together.

4. The ballot cart according to claim 3, wherein said plurality of removable transverse struts are attached to said side-members by tamper-proof bolts.

5. The ballot cart according to claim 1, wherein said privacy assembly comprises a pair of articulating arms pivotally attached to said side members, and a privacy curtain support member pivotally attached to said pair of articulating arms, said privacy assembly being movable from a stowed position to a deployed position for suspending said privacy curtain around said voting equipment.

6. The ballot cart according to claim 5, wherein said privacy curtain support member is inserted through sleeves in said privacy curtain.

7. The ballot cart according to claim 5, wherein said privacy curtain defines an open-bottom enclosure with a divided front panel for entry.

8. The ballot cart according to claim 5, wherein said articulating arms further comprise distal stop-hooks for indexing pivoting of said privacy curtain about said voting equipment.

9. The ballot cart according to claim 2, further comprising a pair of side-mounted grab handles each attached to one of said pair of opposing side-members.

10. The ballot cart according to claim 9, wherein said pair of side-mounted grab handles each attenuate outward pivoting of one of said pair of panels to said open position.

11. A ballot cart for transporting voting equipment, and for parking said voting equipment in an accessible position for use by election officials and voters, all while the voting equipment remains seated in the ballot cart, comprising:
   a pair of opposing side-members each defined by at least two tubular vertical struts connected together by a tubular lateral strut;
   a pair of wheel assemblies each comprising a wheel-mount fixture attached to a lower end of said side-members, and a pair of casters attached to and protruding downwardly from each of said wheel-mount fixtures;
   a plurality of tubular transverse struts joining said side members together; and
   a combination cover/shelf assembly comprising a pair of panels each pivotally attached to an upper end of a respective side-members by an offset hinge and adapted to selectively pivot closed overtop said ballot cart for protection of voting equipment stored therein, or open to form opposed weight-bearing shelves protruding laterally outward from said side members
   a privacy assembly comprising an opposing pair of elongate support arms each pivotally attached at one end by a pivot joint to a respective one of said lateral struts of said opposing side-members, a U-shaped support member pivotally attached at each end by a pivot joint to a respective one of said pair of support arms, and a privacy curtain attached to said U-shaped support member, said pair of support arms and said U-shaped support member being pivotable relative to said opposing side-members and including stop members at said pivot joints to index pivoting of said pair of support arms to a fixed obtuse angle relative to said lateral struts and to index pivoting of said U-shaped support member to a fixed obtuse angle relative to said pair of support arms to thereby to suspend said privacy curtain in front of said voting equipment substantially surrounding a voter inside a partially enclosed area in front of the voting terminal.

12. The ballot cart according to claim 11, wherein said plurality of transverse struts further comprise a plurality of fixedly attached transverse struts joining said side-members together, and a plurality of removable transverse struts joining said side-members together.

13. The ballot cart according to claim 11, wherein said privacy curtain defines an open-bottom enclosure with a divided front panel for entry.

14. The ballot cart according to claim 13, wherein said articulating arms further comprise distal stop-hooks for indexing pivoting of said privacy curtain about said voting equipment.

15. The ballot cart according to claim 11, further comprising a pair of side-mounted grab handles each attached to one of said pair of opposing side-members.

16. The ballot cart according to claim 15, wherein said pair of side-mounted grab handles each attenuate outward pivoting of one of said pair of panels to aid open position.

17. A privacy mechanism for a voter cart for storing, transporting, and using voting equipment, said voter cart comprising a tubular frame with a pair of opposing side-members each defined by at least two tubular vertical struts connected together by a tubular lateral strut, and a plurality of tubular transverse struts joining said side members together, said privacy mechanism comprising:

a deployable privacy mechanism comprising an opposing pair of elongate support arms each pivotally attached at one end by a pivot joint to a respective one of the lateral struts of said frame, a U-shaped support member pivotally attached at each end by a pivot joint to a respective one of said pair of support arms, and a privacy curtain suspended from said pair of support arms, said support arms, said U-shaped support member and said pair of support arms including stop members at said pivot joints to index pivoting of said pair of support arms to a fixed obtuse angle relative to said frame and to index pivoting of said U-shaped support member to a fixed obtuse angle relative to said pair of support arms to thereby suspend said privacy curtain around a substantially enclosed area in front of said voting terminal and voter cart and about the voting terminal;

wherein said voting terminal remains seated in said internal rack storage space upon deployment of said privacy mechanism.

18. The privacy mechanism according to claim 17, wherein said frame further comprises a pair of identical side rails attached together in a parallely-spaced configuration by a plurality of cross-braces.

19. The privacy mechanism according to claim 18, further comprising a pair of side panels pivotally attached to said side rails and pivotable from an outwardly-extending horizontal position for service as a shelf, to an inwardly-deployed horizontal position overtop said rack storage space for protection if said voting terminal.

20. The privacy mechanism according to claim 17, wherein said voting terminal comprises a ballot counter and ballot box.

* * * * *